United States Patent [19]

Yamamoto et al.

[11] 3,751,300

[45] Aug. 7, 1973

[54] METHOD FOR MANUFACTURING A CADMIUM OXIDE ELECTRODE WITH A RESIN FIBER

[75] Inventors: Shohei Yamamoto, Toyonaka; Jun Watanabe, Osaka; Susumu Hosoi, Neyagawa; Akira Hirano, Osaka, all of Japan

[73] Assignee: Matsushita Electric Industries Co., Ltd., Osaka, Japan

[22] Filed: June 8, 1971

[21] Appl. No.: 151,134

Related U.S. Application Data

[63] Continuation of Ser. No. 782,264, Dec. 9, 1968, abandoned.

[52] U.S. Cl. .................................. 136/24
[51] Int. Cl. .......................... H01m 43/04
[58] Field of Search .............. 136/24, 28, 13, 6, 136/120, 121, 75; 162/138, 181 R

[56] References Cited
UNITED STATES PATENTS

| | | | |
|---|---|---|---|
| 3,348,974 | 10/1967 | Barber et al. | 136/86 D |
| 3,551,205 | 12/1970 | Fraioli et al. | 136/121 |
| 3,132,989 | 5/1964 | Steverson | 162/138 |
| 3,377,265 | 4/1968 | Caesar | 204/290 R |
| 3,413,239 | 11/1968 | Olstowski et al. | 136/121 |
| 3,062,700 | 11/1962 | Dalton | 162/138 |
| 3,265,557 | 8/1966 | DeFries et al. | 162/138 |
| 3,293,115 | 12/1966 | Lucken | 162/138 |

Primary Examiner—A. B. Curtis
Assistant Examiner—C. F. LeFevour
Attorney—Stevens, Davis, Miller & Mosher

[57] ABSTRACT

An alkaline battery which comprises a sheet-like negative electrode consisting of a fibrous substance having a powder of active material and if necessary a powder of electrically conductive material attached thereto, and which is large in discharge capacity and long in service life, and has an excellent overcharging characteristic particularly when the said alkaline battery is of the closed-type.

1 Claim, 7 Drawing Figures

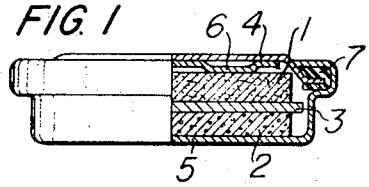
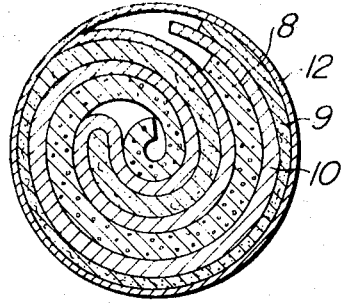
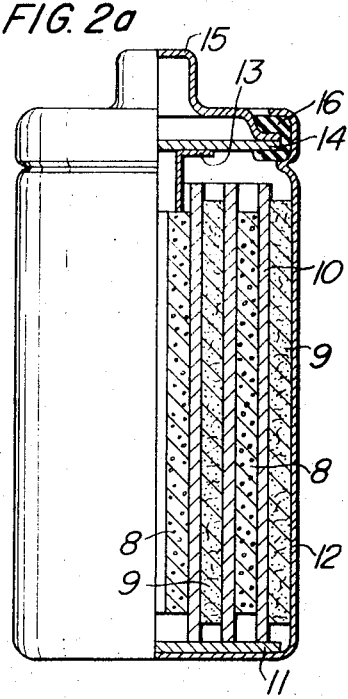
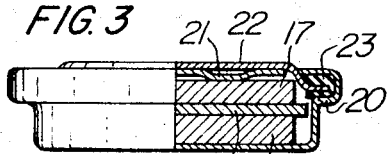
PRIOR ART
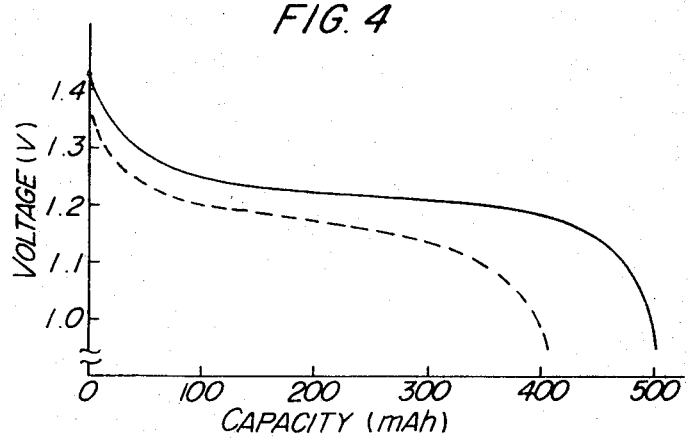

3,751,300

METHOD FOR MANUFACTURING A CADMIUM OXIDE ELECTRODE WITH A RESIN FIBER

CROSS-REFERENCE TO RELATED APPLICATION

This application is a continuation of U.S. Ser. No. 782264 filed on Dec. 9, 1968 now abandoned.

BACKGROUND OF THE INVENTION

1. Field of the Invention

The present invention relates to alkaline batteries and more particularly relates to improvements in alkaline batteries of the type comprising a positive electrode, a negative electrode and a separator interposed between said positive electrode and said negative electrode.

2. Description of the Prior Art

Conventional alkaline batteries are classified into two types, i.e. the so-called sintered alkaline battery and the pocket-type alkaline battery. The sintered alkaline battery is of the type wherein a porous, sintered nickel substrate carrying nickel hydroxide on the surface thereof is used as a positive electrode and a porous, sintered nickel substrate carrying cadmium on the surface thereof as a negative electrode. On the other hand, the pocket-type alkaline battery is of the type wherein a nickel screen or a nickel-plated porous steel sheet covered with a mixture of nickel hydroxide and graphite is used as a positive electrode and a nickel screen or a nickel-plated porous steel sheet covered with a mixture of cadmium hydroxide or cadmium oxide and nickel or iron as a negative electrode. Generally, it is common to use a sintered positive electrode in combination with a sintered negative electrode and a pocket positive electrode in combination with a pocket negative electrode, but these electrodes may be used in different combinations.

The sintered alkaline battery has many meritorious features, such as that a relatively high rate discharge is possible, that the discharge voltage is high, that utility of the active material is high, that the strength of the electrodes is great, that the charging-discharging cycle characteristic is stable and that the overcharge capacity is particularly large because, since the electrodes are in the form of a thin sheet, the reaction area thereof can be increased. On the other hand, however, the battery of this type has the drawback that the capacity thereof is subjected to a limitation due to the fact that the sintered substrate occupies a large volume and accordingly the amount of the active material which can be charged is reduced, and it is particularly disadvantageous in that the manufacture of the electrode plates is extremely complicated and therefore the cost of the battery becomes high.

The pocket-type alkaline battery has advantages and disadvantages which are the reverse of those of the sintered type. Namely, it can be manufactured relatively easily and is relatively low in cost and large in low rate discharge capacity, but on the other hand, it is not suitable for high rate discharge and relatively poor in charging-discharging cycle characteristic. Such disadvantages of the pocket-type alkaline battery can be attributed to the fact that the utility of the active material and the overcharging capacity are low relative to those of the sintered type. In the sintered alkaline battery nickel substrate having a large true surface area is used for the cadmium negative electrode, so that the true charging or discharging current density is small and as a result, less polarization takes place and the hydrogen gas generating potential can hardly be arrived at. Further, the electrode provides large reaction area for the reduction of oxygen gas which is generated on the positive electrode and therefore the internal pressure rise of the battery is small. On the contrary, in the pocket-type alkaline battery the reaction area for the reduction of oxygen gas generated on the positive electrode is extremely small as compared with that of the sintered alkaline battery because it is believed that the oxygen gas is reduced only by the nickel screen or the porous plate on the surface of the negative electrode. In the closed-type alkaline battery, it is essential, from the standpoints of cycle life and safety, for the battery to have excellent overcharging characteristic and high utility of the active material.

SUMMARY OF THE INVENTION

The present invention contemplates the elimination of the aforesaid drawbacks possessed by the negative electrodes of the conventional closed-type alkaline batteries. In other words, the present invention contemplates the provision of an alkaline battery which possesses simultaneously the meritorious features of the sintered negative electrode and the meritorious features of the pocket-type negative electrode while eliminating the defects of both of said negative electrodes; which has large capacity and excellent overcharging property; and which is long in service life and low in production cost.

According to the present invention, use is made, as a positive electrode, for example, of a porous substrate which consists of a sintered powder, such as sintered nickel powder, and carries nickel hydroxide thereon; or an alkali-resistant, electrochemically inactive and electrically conductive porous container, e.g. a container of nickel screen, filled with a mixture consisting of nickel hydroxide as being an active material and nickel or carbon as being an electrically conductive material; and as a negative electrode, of a sheet of paper consisting of an alkali-resistant, electrochemically inert, fibrous material having a powder of active material or a mixture of said powder of active material and a powder of electrically conductive material bonded to the surface thereof, said powder of active material being composed of one or more compounds selected from the group consisting, for example, of cadmium, cadmium oxide and cadmium hydroxide, and said powder of electrically conductive material consisting, for example, of such a compound as nickel or carbon.

BRIEF DESCRIPTION OF THE DRAWING

FIG. 1 is a side elevation, partly in section, of a flat, closed-type nickel-cadmium alkaline battery according to the present invention.

FIGS. 2a and 2b are a side elevation, partly in section, and a transverse section through the bottom portion, respectively of a cylindrical, closed-type nickel-cadmium alkaline battery according to the invention.

FIG. 3 is a side elevation, partly in section, of a conventional flat, closed-type nickel-cadmium alkaline battery.

FIG. 4 is a chart showing a curve representing the discharge terminal voltage in the third cycle of the cylindrical, closed-type nickel-cadmium alkaline battery.

DESCRIPTION OF THE PREFERRED EMBODIMENTS

Figure 5:
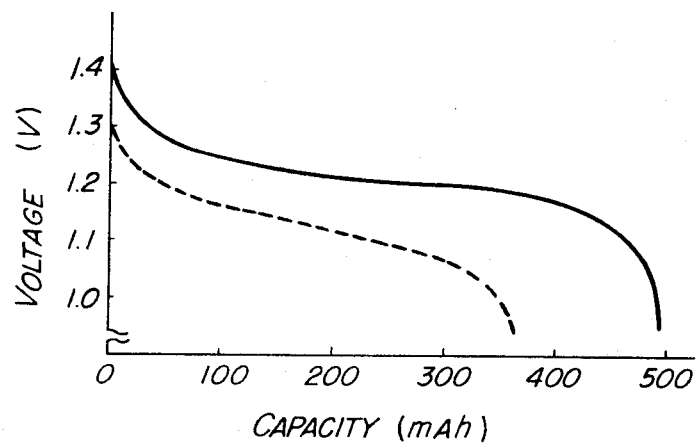
FIG. 5 is a chart, similar to FIG. 4, showing a curve representing the terminal voltage in the 200th cycle of the battery.

The positive electrode used in the battery of this invention is the so-called sintered positive electrode which is prepared by a process comprising impregnating a porous substrate of sintered carbonyl nickel powder with nickel nitrate, decomposing the nickel nitrate in a vapor atmosphere by the method described, e.g. in U.S. Pat. No. 3,041,388, to convert it into nickel hydroxide and then subjecting the substrate to a predetermined formation in an aqueous solution of caustic potash; or is the so-called pocket-type positive electrode which is prepared by a process comprising molding a mixture consisting of nickel hydroxide powder, flaky graphite powder and nickel powder with pressure into a disc or cylindrical shape, covering the molded body with a 100 to 150 mesh nickel screen or nickel-plated iron screen, shaping the screen-covered body into a desired shape under pressure and then subjecting the shaped body to a predetermined formation in an aqueous solution of caustic potash.

On the other hand, the negative electrode used in the present battery is prepared by a process comprising mixing cadmium oxide and an electrically conductive material, e.g. nickel powder of flaky graphite powder with an alkali-resistant fiber, e.g. an acrylic fiber (e.g. Dynel as trade name), making a paper with said mixture using an ordinary paper machine, drying the resultant paper, pressing the paper into a desired thickness and subjecting the paper to a predetermined formation in an aqueous solution of caustic potash.

Using the positive electrode and the negative electrode obtained in the manner described above and a separator consisting, for example, of a non-woven fabric of polyamide fiber, a closed-type alkaline battery as shown in FIG. 1 or 2 is produced.

Namely, in FIG. 1 there is shown an embodiment of a flat-type battery according to the present invention. A negative electrode 1 and a positive electrode 2, which are produced in the manner described above, and a separator 3 are placed in a battery casing 5 which simultaneously serves as positive terminal and the top opening of said battery casing 5 is closed with a cover plate 4 which simultaneously serves as negative terminal. A pressing spring 6 is provided to depress the battery elements. The positive terminal-constituting battery casing and the negative terminal-constituting cover plate 4 are electrically insulated from each other by an insulating packing 7 which is made of resin, rubber or other insulating material and which effects sealing between said battery casing and said cover plate.

FIG. 2 shows an embodiment of a cylindrical battery according to this invention. In this battery, a laminate of a sintered positive electrode 8, a paper-like negative electrode 9 and a separator is wound in a helical shape and disposed in a negative terminal-constituting battery casing 11 with a resin-made insulating plate 11 interposed between it and the bottom face of said casing. A lead wire 13 extending from the positive electrode 8 is connected to a metallic cover plate 14 which in turn is electrically connected to a positive terminal 15. The positive electrode and the negative terminal-constituting battery casing are electrically insulated from each other by an insulating packing 16 which is made of resin, rubber or other insulating material and which effects sealing between the positive electrode and the negative electrode.

FIG. 3 shows a conventional flat-type battery. As shown, a sintered or pocket-type positive electrode 18, a sintered or pocket-type negative electrode 17 and a separator 19 are accommodated in a positive terminal-constituting battery casing 20, and the top opening of the battery casing 20 is closed with a cover plate 22 with a pressing spring 21 interposed between said cover plate and said negative electrode.

The positive electrode 2 in the flat-type battery shown in FIG. 1 may be of either sintered-type or pocket-type. Further, although in the cylindrical battery shown in FIG. 2 use is made of a sintered positive electrode, a pocket-type positive electrode may obviously be used. In this case, it is common that the pocket-type positive electrode is disposed in the center of the laminate and the negative electrode-constituting paper is arranged concentrically around said positive electrode with the separator intervening therebetween.

Next, the method of producing the negative electrode-constituting paper will be described by way of example. The most important feature of the present invention resides in the use of the negative electrode-constituting paper or, in other words, in enabling a powdery material to be provided in the shape of a sheet of paper by applying the paper-making technique. In making paper, it is generally practiced to add clay or starch to a paper stock for the purpose of increasing the strength of the produced paper and improving the affinity of said paper to printing ink. However, the amount of clay or starch added is as small as about 30 percent of the total amount of the paper-making fiber or even smaller. In the paper which is used in the present invention as an electrode, only the powder present in the paper is useful while the fiber serves merely as a shaping material. It is, therefore, preferable to reduce the amount of the fiber to a minimum relative to the powder.

The present inventors have found that a paper comprising a larger amount of the powdery material than fibers could be obtained by causing the powdery material to be bonded to the surface of the fiber before the paper-making operation. The method which was employed by the present inventors for bonding the powdery material to the surface of the fibers will be illustrated by way of example hereunder, though many other methods may also be employed:

EXAMPLE 1

Five parts of an acrylic fiber was added to a mixture consisting of 80 parts of cadmium oxide powder, ten parts of carbonyl nickel powder and ten parts of flaky graphite powder, and mixed therewith. On the other hand, two parts of polyvinyl alcohol having a saponification degree of not lower than 98 percent was dissolved in 300 parts of hot water, to which the aforesaid mixture was added to form a slurry. The slurry was ejected through a nozzle into a stream of hot air with pressure, whereby the mixed powder was attached to the surface of the fiber and dried thereon. The mixed powder was bonded to the fiber by means of polyvinyl alcohol. The powder-carrying fiber is again dispersed in water and a paper was made by the ordinary method using the dispersion. In this case, the powder does not detach from the fiber as polyvinyl alcohol having a high saponification degree is insoluble in cold water.

EXAMPLE 2

Eighty parts of cadmium oxide powder, 20 parts of carbonyl nickel powder and 4 parts of alkali-treated linter pulp were dispersed in water while stirring. To the dispersion were added 1 part of carboxymethyl cellulose as an adsorbent and 0.001 part of copolycondensate of carboxymethyl cellulose and acrylamide as a high polymer precipitant. The cadmium oxide and the carbonyl nickel powders were adsorbed by the linter pulp and the liquid became substantially transparent. Using this paper stock, a paper was made and dried.

As fiber, alkali-treated vegetable fibers, such as wood pulp and linter pulp; synthetic fibers, such as acrylic fibers and polymide fibers; inorganic fibers, such as asbestos; carbon fiber; steel wool and nickel wool, etc. may be used. Use of carbon fiber and metallic fibers is advantageous in improving the electric conductivity of the produced paper. In any case, the fiber used must be stable in an electrolyte. Steel wool is preferably plated with nickel or cadmium. The diameter and the length of the fiber used are not particularly limited.

The electric conductivity of the electrode-constituting paper may be improved in many ways. Namely, use of an electrically conductive fiber as described above is one way and use of an alkali-resistant, electrically conductive powder, such as carbon (graphite) powder or nickel powder as illustrated in the other Example, is another way. It has also been practiced to attach with pressure an electrically conductive porous plate, i.e. metal screen, or a perforated metal plate of suitable aperture density to one or both sides of a thin plate electrode having low conductivity, or to place the same between such electrodes. This method can also be employed in the present invention. The metal screen or the perforated metallic plate used is preferably of such material as iron or nickel, and is preferably plated with nickel or further with cadmium in case the material thereof is iron and with cadmium in case the material thereof is nickel. A screen or cloth of carbon fiber may be used in place of the metallic screen or plate. In the present invention, these conductors are effectively and most suitably integrated with the electrode in the process of the paper-making operation and not after making the electrode-constituting paper. Namely, the conductor is passed through the nip of the first squeeze rolls of a Fortlinear paper machine, cylinder machine or other paper-making machine, along with the paper stock in the normal paper-making operation. When the conductor is desired to be placed in the center of the electrode-constituting paper, this can be accomplished by forming another layer of the powder-carrying fiber on top of the conductor. In this way, the fiber is caught in the mesh of the conductor and thereby the delamination strength of the paper layer is increased. After passing through the first squeeze rolls, the paper thus formed is passed through each of the subsequent squeeze rolls and drying rolls, and then taken up on a winder or cut into a desired size. In this case, the strength of the paper may be further increased by forming a mesh or an emboss on the surface of one or both of the final squeeze rolls or press rolls through which the paper is passed after being dried. The provision of such mesh or emboss is particularly advantageous in preventing delamination or disengagement of the paper layer from the conductor during the subsequent formation of the paper material. The thickness of the electrode-constituting paper can be selected optionally in accordance with the size of the battery in which it is to be used, but is preferably of the order of 0.2 to 2 mm, particularly 0.5 to 1.2 mm, before the formation.

According to the method of this invention, the proportion of the fibrous material to the powder can be selected in a very wide range. As stated previously, however, the relative amount of the fibrous material should be reduced to a minimum in the light of the fact that it does not contribute to the electricity-generating reaction of the battery per se but serves merely as a carrier. When incorporating a powder in a paper heretofore, the amount of the powder was generally smaller than the amount of the paper-making fiber. According to the method of this invention, however, the amount of fiber can be reduced to 20 parts by weight or even smaller per 100 parts by weight of powder. The experiments have revealed that a suitable amount of the fibrous material is within the range of 2 to 4 parts by weight, though it is even possible to reduce the amount to 1 part by weight if close attention is paid to the paper-making operation.

In operating the ejection method as described in Example 1, the medium used may be water or a low boiling point organic solvent, such as, for example, alcohol or trichloroethylene. As binder, water-soluble high polymers, such as carboxymethyl cellulose, sodium polyacrylate, etc., and an emulsion of polyvinyl chloride may also be used besides the aforesaid polyvinyl alcohol. In operating the precipitation method as described in Example 2, water-soluble high polymers, such as polyvinyl alcohols, sodium polyacrylate, etc., may be used as an adsorbent, besides the carboxymethyl cellulose, and inorganic compounds, such as aluminum sulfate, alum, etc., may be used as a precipitant, besides the carboxymethyl cellulose.

The electrode-constituting paper thus obtained is cut into a suitable size and after being clipped by a metallic clip having a lead wire connected thereto or connecting a lead wire to the metallic porous plate, subjected to a predetermined formation in an alkaline electrolyte according to the ordinary method. The paper thus formed is washed with water and dried, and if necessary, further cut into a prescribed size and assembled with the other battery elements in the manner described previously to form a battery.

FIGS. 4 and 5 show the terminal voltage curves during discharge of IEC Designation R6 size and ASA Designation AA size alkaline batteries having a diameter of 14 mm and a height of 50 mm and having an internal structure as shown in FIG. 2 respectively. The chart of FIG. 4 shows the curves in the third cycle and the chart of FIG. 5 shows the curves in the 200th cycle. In either chart, the solid curve is for a constant current of 100 mA and the dotted curve is for a constant current of 1000 mA.

The batteries show substantially no deterioration at the light load of 100 mA, and the capacity is considerably larger than that of a conventional battery even at the heavy load of 1,000 mA. The proportion of the capacity to the 100 mA discharge is 80 percent in the third cycle and 70 percent in the 200th cycle, as contrasted to those of the conventional batteries which are mostly 50 percent or below in the third cycle and substantially zero in the 200th cycle.

Figure 6:
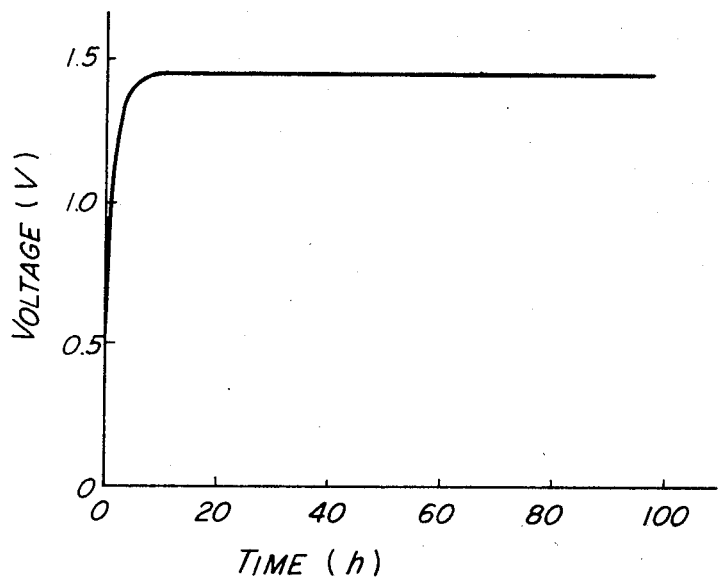
FIG. 6 is a chart showing the overcharge curve of the battery.

FIG. 6 is a chart illustrating the gas absorption capacity of the present battery. In a closed-type nickel-cadmium battery, the negative electrode to positive electrode proportion is usually made large so that the gases generated on the positive electrode during charging may be absorbed by the negative electrode. However, even in this case the gases are not absorbed efficiently and accordingly the internal pressure of the battery rises constituting a danger of rupture of the battery, if the method by which the negative electrode was produced is not adequate. Therefore, the gas absorption capacity may be determined by directly measuring the internal pressure of the battery but in order to determine the gas absorption capacity accurately, it is usual to measure the voltage change at the battery terminals. Namely, the terminal voltage of the battery will rise at the end of the operation if the gas absorbing efficiency of the negative electrode is low but will not rise after the voltage has reached the state of equilibrium if the gases are absorbed efficiently. FIG. 6 shows the terminal voltage change when the battery of the characters shown in FIGS. 4 and 5 is charged with a current of 50 mA after it has been discharged. As seen, the terminal voltage does not change even when the battery is charged successively after completion of the charging which usually takes 15 hours. This means that the gases are absorbed sufficiently.

We claim:

1. A method for manufacturing a negative electrode for a nickel-cadmium storage battery, comprising:
   dispersing in water a powder comprising cadmium oxide, and a synthetic resin fiber,
   adding to the dispersion for depositing and adhering said powder to the surfaces of said fibers, said precipitant comprises a material selected from the group consisting of a copolycondensate of carboxymethyl cellulose and acrylamide, aluminum sulfate, and alum and said adsorbent comprises a material selected from the group consisting of carboxymethyl cellulose, sodium polyacrylate, and polyvinyl alcohol
   and forming said fibers having the powder adhered thereto into a paper-like sheet of negative electrode material.

* * * * *